United States Patent [19]
Goldberg et al.

[11] Patent Number: 5,742,509
[45] Date of Patent: Apr. 21, 1998

[54] PERSONAL TRACKING SYSTEM INTEGRATED WITH BASE STATION

[75] Inventors: Steven H. Goldberg, Cupertino; Greg Kremer, San Jose; Paul M. Davis, Mountain View, all of Calif.

[73] Assignee: Trimble Navigation Limited, Sunnyvale, Calif.

[21] Appl. No.: 420,242

[22] Filed: Apr. 11, 1995

[51] Int. Cl.⁶ .................................. G06F 165/00
[52] U.S. Cl. .................. 364/449.5; 340/990; 342/450
[58] Field of Search .................. 364/449, 443, 364/455, 459, 449.5, 449.2; 73/178 R; 342/357, 358, 450, 451, 457, 463, 465, 449.1, 449.3, 449.7, 449.95, 453, 460; 340/990, 993

[56] References Cited

U.S. PATENT DOCUMENTS

| | | | |
|---|---|---|---|
| 4,750,197 | 6/1988 | Denekamp et al. | 379/58 |
| 4,975,707 | 12/1990 | Smith | 342/357 |
| 5,043,736 | 8/1991 | Darnell et al. | 342/357 |
| 5,119,102 | 6/1992 | Barnard | 342/357 |
| 5,142,281 | 8/1992 | Park | 340/991 |
| 5,187,805 | 2/1993 | Bertiger et al. | 455/12.1 |
| 5,202,829 | 4/1993 | Geier | 364/449 |
| 5,223,844 | 6/1993 | Mansell et al. | 342/357 |
| 5,225,842 | 7/1993 | Brown et al. | 342/357 |
| 5,270,937 | 12/1993 | Link et al. | 364/449 |
| 5,303,393 | 4/1994 | Noreen et al. | 455/3.2 |
| 5,327,144 | 7/1994 | Stilp et al. | 342/387 |
| 5,334,974 | 8/1994 | Simms et al. | 340/990 |
| 5,389,934 | 2/1995 | Kass | 342/357 |
| 5,422,816 | 6/1995 | Sprague et al. | 364/449 |
| 5,430,654 | 7/1995 | Kyrtsos et al. | 364/449 |
| 5,452,211 | 9/1995 | Kyrtsos et al. | 364/449 |
| 5,504,491 | 4/1996 | Chapman | 342/357 |
| 5,512,908 | 4/1996 | Herrick | 342/387 |
| 5,515,043 | 5/1996 | Berard et al. | 340/988 |
| 5,519,760 | 5/1996 | Borkowski et al. | 379/59 |
| 5,526,357 | 6/1996 | Jandrell | 370/95.2 |

*Primary Examiner*—Collin W. Park
*Attorney, Agent, or Firm*—Boris G. Tankhilevich

[57] ABSTRACT

The personal tracking system including the intelligent position determining means coupled with the cellular phone and the base station is disclosed. The base station includes a computer, a modem, and a telephone. The computer further includes base station software for communicating with the mobile unit. The mobile unit transmits the location data to the base station at certain times and at certain locations.

3 Claims, 6 Drawing Sheets

PERSONAL TRACKING SYSTEM INTEGRATED WITH BASE STATION

BACKGROUND

In the prior art there are several well-known systems designed to control a plurality of mobile units.

U.S. Pat. No. 4,750,197 issued to Denekamp and Hannon, discloses an integrated cargo transportation security system for control a fleet of enclosed cargo transportation containers. Each container includes a subsystem including a door sensor for sensing access door opening and closure, a module unit including a connecting frame for a removable module and a cabling leading to the door sensor. The system includes a central data collection and processing facility for processing cargo trip data collected by at least one active module. The module unit having an active module includes a self contained power supply, a location detector for detecting present location of said container, a clock, a central processor for generating a sequence of status numbers indicative of accumulated location, time and door status, and a memory for storing the sequence during the trip. The system further includes means for transferring the status number sequence to the central data collection and processing facility. A radio link is provided to connect the container module to the central data facility in real time.

Darnell and Douglas in U.S. Pat. No. 5,043,736 disclose a cellular position locating system for ascertaining the latitude and longitude of an individual or object at a remote location and transmitting information to a base operation using a man-pack or singular portable personnel unit. The portable unit comprises a cellular telephone network in conjunction with a satellite navigation unit. The base station includes a computation system for decoding the position data transmitted from the remote units through the cellular telephone system.

In U.S. Pat. No. 5,119,102 issued to Barnard, a vehicle location system is disclosed which makes use of a satellite-based global positioning system (GPS) of the NAVSTAR type and which has application to an automatic vehicle location (AVL) system for use with a fleet of vehicles, each of which is in radio contact with a base station. The AVL system comprises at least one vehicle mounted equipment including means for receiving signals directly from the GPS and a fixedly suited base station including first means for receiving signals directly from the GPS. The vehicle mounted equipment also includes means for recording the received GPS signals and means for retransmitting the recorded GPS signals to the base station. The fixedly based station includes second means for receiving the recorded GPS signals retransmitted by the vehicle mounted equipment, and position determining means coupled to the first and second receiving means for determining position of the vehicle at the time the vehicle mounted equipment received the GPS signals.

Park in U.S. Pat. No. 5,142,281 discloses a vehicle mounting apparatus for an automatic vehicle location system which transmits a vehicle location signal to a control center in response to a reference signal from the control center. The vehicle location system includes a omni-directional antenna, a transmitting and receiving switch, an oscillator frequency converter, a frequency-shift keying demodulator, post office committee standard associate group decoder, a pseudorandom noise signal generator, a phase-shift keying modulator, a transmitting signal generator, a power amplifier, and a power supplier.

Wortham in U.S. Pat. No. 5,155,689 discloses a vehicle locating and communicating method and apparatus for locating and communicating with vehicles. (In U.S. Pat. No. 5,299,132 Wortham discloses the same apparatus employing a cellular telephone network for locating and communicating with vehicles.) The apparatus includes at least one mobile cellular unit connected to at least one microprocessor and installed within a vehicle. The microprocessor interrogates the mobile cellular unit to obtain location information from an overhead message stream transmitted from cellular telephone transmitter sites. The location is displayed on a display located in the vehicle or the microprocessor which periodically instructs the mobile cellular unit to initiate a call to a host controller and, upon receipt of transmitting instructions from the host controller, transmits the location information for display on a screen connected to the host controller.

U.S. Pat. No. 5,225,842, issued to Brown and Sturza, discloses a low cost vehicle tracking system employing GPS satellites that is capable of tracking several hundred vehicles or platforms using a low bandwidth data link. The tracking system comprises a sensor means mounted on each object that supplies the data required to locate a particular vehicle, a two-way vehicle location system (VLS) communication link, and a VLS workstation to process the data and display the vehicle location.

Mansell and Riley in U.S. Pat. No. 5,223,844 disclose a vehicle tracking and security system which allows mediate response in case of vehicle theft, an accident, vehicle breakdown, or other emergency. Guardian and tracking functions are provided through Mobile Units installed in hidden locations in vehicles to be monitored. A Mobile Unit communicates with a Control center by using a transceiver which is a part of the Mobile Unit. The vehicle's location being determined by the GPS may be automatically transmitted to the Control Center along with any automatic alarm signal. The system provides continuous monitoring of a large number of vehicles for a broad range of status and emergency conditions over a virtually unlimited geographic area.

In U.S Pat. No. 5,270,937 Link and Spencer disclose a vehicle map position determining apparatus. The apparatus includes a map memory means which stores map data defining fixed road segments that exist in an overall geographical area, a determining means for accessing the map data, a means for receiving vehicle position data, and a utilization means coupled to the receiving means and the determining means for utilizing the vehicle position data and the map data in the map memory means which defines the road segments. The determining means includes means for receiving data defining start and end coordinates of each of said road segments, means for defining subregion in terms of boundary coordinates, means for comparing start and end road segments coordinates with the boundary coordinates, and logical means for identifying any of said road segments as having at least a portion inside the subregion.

Noreen and Harper in U.S. Pat. No. 5,303,393 disclose an integrated radio satellite response system and method permitting the integration of analog or digital audio broadcast services with personal communications services and navigation services into low-cost mobile radios. The system has an ability, from a mobile terminal, to signal an emergency condition or to order products or services offered in advertisements. The radio response system includes a broadcast station, a satellite relay, a processing center, and a plurality of user terminals. Each user terminal has a broadcast receiver, a communications interface device, a controller, and a data transmitter. The broadcast station broadcasts a program signal. The communications interface device communicates the program signal to a user. The controller generates a user-data signal from identification information transmitted in connection with the program signal. The data transmitter transmits the user-data signal at a carrier frequency as a transmitted-data signal. The satellite relays the user-data signal to the processing center.

In U.S. Pat. No. 5,334,974, Simms et al disclose a personal security system which quickly and accurately provides a central dispatch operator with emergency information displayed on digitized electronic map in a format which allows efficient dispatching of emergency assistance to a mobile person. The system comprises the mobile unit including a memory, a keyboard, a LORAN-C receiver for providing position information, a processor, and a cellular phone; and a central dispatch station comprising a communication circuit for receiving a digital code from the mobile unit, a programmable memory containing identification information relating to a mobile unit, and a video display.

What is needed is a personal integrated tracking system including an intelligent position locating and communicating device called "watson" installed in a mobile unit, and a base station including a base station software (BSS) which is able to perform several basic operations.

At first, the base station employing BSS should be able to communicate with the watson device when called by the watson device or when commanded to call the watson device to request the ID of watson to make the positive identification, and to receive the location of the watson device at certain sending times. Secondly, the base station should be able to display the location of watson on the electronic map. Lastly, the base station should be able to change the configuration of the watson device which includes timing and other requirements for watson to call the base station.

SUMMARY

The present invention is unique because it allows one to use the base station including a BSS to configure and control the watson device installed in the mobile unit.

One aspect of the present invention is directed to a personal tracking system integrated with a base station. The system comprises at least one watson communication device, a base station, and at least one communication link, wherein each communication link connects at least one watson device with the base station. The watson device can be mounted on a vehicle. The watson communication device includes a location determination means, a microprocessor, a modem, and a communication means connected to the modem. The base station includes a base station computer, a base station modem, and a base station software (BSS) installed into the base station computer.

In one preferred embodiment, the location determination means can include a Global Positioning System (GPS) Receiver, or a Global Orbiting Navigational Satellite System (GLONASS) Receiver. In another preferred embodiment, the location determination means can include an inertial navigation system, a gyroscope system, or a local magnetic field sensor system. Yet, in one more embodiment, the location determination means includes a Loran, Tacan, Decca, Omega, JTIDS Relnav, PLRS, or VOR/DME Receiver.

The communication link can employ a radiowave frequency band, an infrared frequency band, or a microwave frequency band. The communication link can include the ISM (industrial scientific medical) unlicensed operation band, including 900 MHz, 2.4 GHz, or 5.8 GHz bands, wherein the user can own the both ends of the ISM communication system, or a 1.8 GHz band that supports the personal communications services (PCS). The communication link can also include a real time circuit switched communication link.

In one embodiment, the communication means includes a Low Earth Orbiting Satellites (LEOS) used to store and to forward digital packet data. The communication means can also include a cellular telephone communication means, a paging signal receiving means, a wireless massaging services, a wireless application services, a wireless WAN/LAN station, or an Earth-satellite-Earth communication module that uses at least one satellite to relay a radiowave signal. The cellular telephone communication means can include an Advanced Mobile Phone System (AMPS) including a modem, wherein the modem can comprise a DSP (digital signal processor) modem, or a cellular digital packet data (CDPD) modem. The cellular digital communication means further includes a means of modulation of digital data over a radiolink using a time division multiple access (TDMA) system, or a code division multiple access (CDMA) system.

One more aspect of the present invention is directed to the BSS which comprises a user interface, wherein the user interface receives commands from the user; a central database connected to the user interface; wherein the central database exchanges data and commands with the user interface or other applications; and a communications controller connected to said central database; wherein the communications controller receives commands and data from the central database and sends data to the central database; and wherein the communications controller exchanges data with the modem.

Yet one more aspect of the present invention is directed to a method of personal tracking using a personal tracking system. The method comprises the steps of: (1) sending each watson ID-number to the base station by each watson device; (2) communicating the commands of the base station to each watson communications device by employing the modem; (3) determining the location of each watson device; (4) communicating the location of each watson device to the base station; (5) receiving the location of each watson device by the base station; and (6) updating the data related to each watson device in the non-volatile memory; (7) displaying the location of each watson device on a electronic map, wherein the electronic map is a part of the base station; (8) changing the configuration of each watson device; and (9) communicating configuration commands of the base station to each watson communication device.

In one embodiment, the step of communicating commands of the base station to each watson communication device further comprises the steps of: (1) introducing user-commands and user-data to the user interface by the user; (2) communicating user-commands and user-data to the central database by the user interface; (3) storing user-commands and user-data in the central database; (4) outputting database-commands and database-data from the central database to the communications controller; (5) processing database-commands and database-data by the communications controller to obtain controller-data and controller-commands; (6) sending controller-data and controller-commands by the communications controller to the modem; (7) automatic dialing each watson telephone-number by the modem; and (8) transmitting controller-data and controller-commands to each watson device.

In another embodiment, the step of communicating commands of the base station to each watson communication device further comprises the steps of: (1) manual dialing each watson telephone number by the user; and (2) sending user-commands and user-data to each watson device.

In one embodiment, the step of changing the configuration of each watson device further comprises the steps of: (1) receiving commands and data from the base station by the cellular phone of each watson device; (2) transmitting base-station-commands and base-station-data by the cellular phone to the microprocessor of each watson device; (3) processing base-station commands and base-station-data by each watson microprocessor; (4) updating commands and data stored in non-volatile memory; (5) determining at least one sending time, wherein each sending time is the starting time at which the watson device sends its location coordinates to the base station; (6) determining at least one frequency with which the watson device sends its location coordinates to the base station; (7) updating commands and data stored in the non-volatile memory of the watson device; (8) updating vehicle commands, wherein each watson device is installed in the vehicle and wherein the step of updating vehicle commands can further include the step of turning the vehicle's engine off; and (9) sending by each watson device its telephone number to the base station.

In one more embodiment, the step of changing configuration of watson device further includes the step of transmitting to the watson device the coordinates of certain locations, wherein the watson device has to report its position data to the base station at that certain locations.

Yet in another embodiment, the step of changing the configuration of the watson device further comprises the step of sending to the watson device the boundaries of the alarm zone, wherein the alarm zone is the location wherein the watson device has to report its position to the base station.

Yet in one more embodiment, the step of changing the configuration of the watson device further comprises the step of sending to the watson device the route and the schedule information, wherein the watson device has to report its position to the base station if it deviates from or if it adheres to the route and the schedule.

In one embodiment, the step of communicating the location of the watson device to the base station further comprises the step of transmitting the coordinates of location of the watson device by the cellular phone at sending times.

In another embodiment, the step of communicating the location of the watson device to the base station further comprises the step of transmitting the coordinates of location of the watson device by the cellular phone when the watson device reaches the boundaries of the alarm zone.

Yet in one more embodiment, the step of communicating the location of the watson device to the base station further comprises the step of transmitting the coordinates of location of the watson device by the cellular phone when the watson device deviates from or adheres to the route and the schedule.

In one embodiment, the step of displaying the location of the watson device on the electronic map of the base station further comprises the steps of: (1) receiving the coordinates of location of the watson device at sending times by the computer via the modem; and (2) imposing the location of the watson device on the electronic map.

In another embodiment, the step of displaying the location of the watson device on the electronic map of the base station further comprises the steps of: (1) receiving the coordinates of location of the watson device when the watson device reaches the boundaries of the alarm zone; and (2) imposing the location of the watson device when it reaches the boundaries of the alarm zone on the electronic map.

Yet in one more embodiment, the step of displaying the location of the watson device on the electronic map of the base station further comprises the steps of: (1) receiving the route and the schedule information; and (2) imposing the location of the watson device when it deviates from or when it adheres to the route and the schedule.

One can track the location of a rental car, a personal car, a delivery van, a person, or a personal belonging, etc. by installing a watson device in the rental car, in the personal car, in the delivery van, on the body of the person, in the personal belonging, etc.

FULL DESCRIPTION OF THE PREFERRED EMBODIMENT

Figure 1:
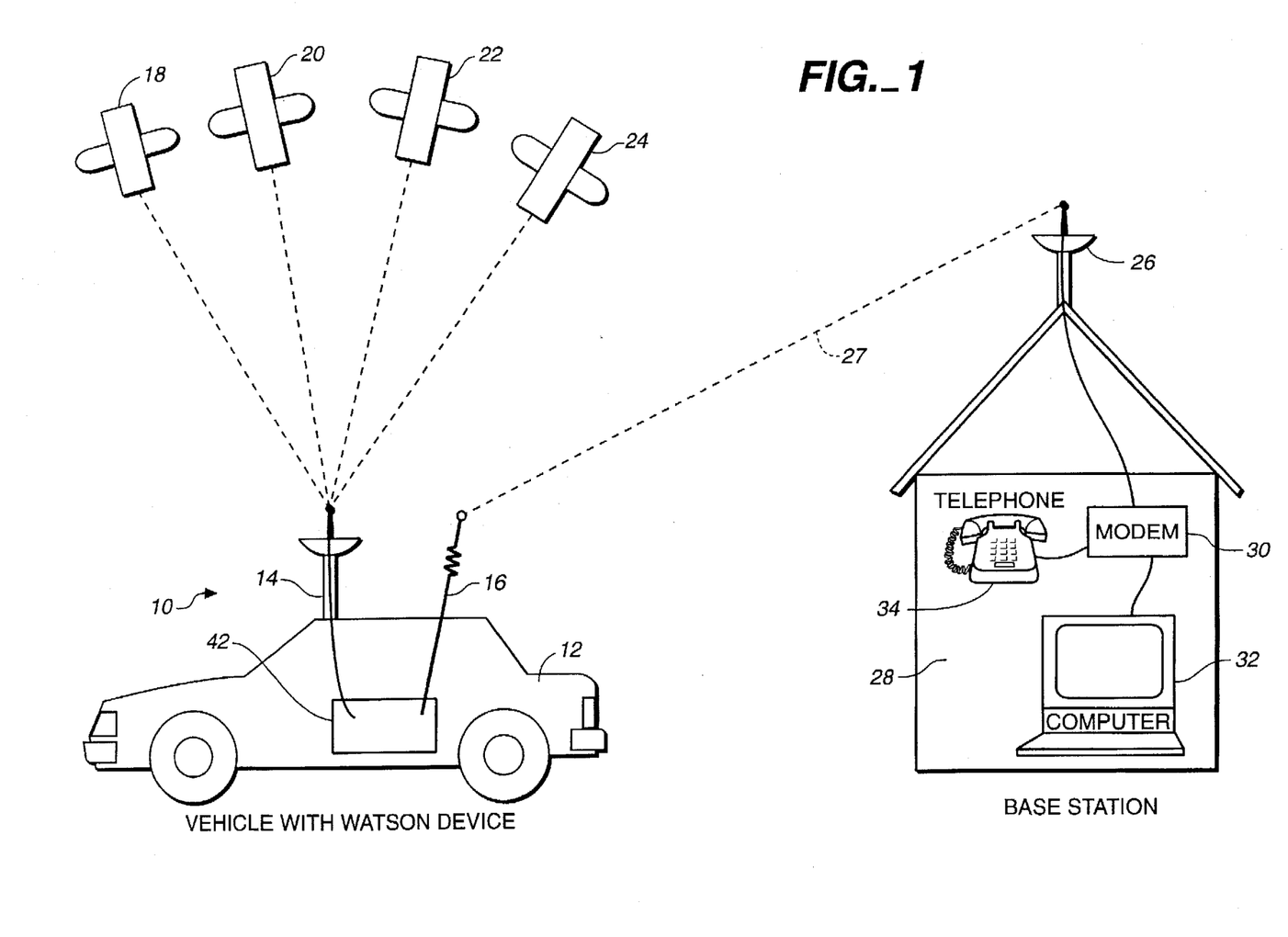
FIG. 1 illustrates a personal tracking system integrated with the base station.

FIG. 1 illustrates a personal tracking system 10 integrated with a base station 28 which is used for tracking a vehicle 12 with the installed at least one watson device 42. (See the detailed description of the watson device below.) The watson device includes a position determining means.

In one embodiment, the position determination means can include a satellite positioning system (SATPS) receiver, such as a global positioning system (GPS) receiver, or a Global Orbiting Navigational Satellite System (GLONASS) Receiver. Yet, in another embodiment, the position determination means can include an inertial navigation system, a gyroscope system, or a local magnetic field sensor system. Yet, in one more embodiment, the location determination means includes a Loran, Tacan, Decca, Omega, JTIDS Relnav, PLRS, or VOR/DME Receiver.

In the preferred embodiment, the position determining means includes a Global Positioning System (GPS) receiver 72 (FIG. 3) with a GPS antenna 14. The GPS antenna may be a magnetically mountable model 21423-00 commercially available from Trimble Navigation of Sunnyvale, Calif., and may be placed on the vehicle 12 with the direct view of the sky as shown in FIG. 1. The GPS receiver can be a model SveeSix, 6-channel receiver module manufactured by Trimble Navigation. In the preferred embodiment, the GPS antenna 14 is able to receive the satellite signals from at least four satellite-vehicles SV1 (18), SV2 (20), SV3 (22), and SV4 (24). These four satellites are part of the GPS.

The GPS is a system of satellite signal transmitters, with receivers located on the Earth's surface or adjacent to the Earth's surface, that transmits information from which an observer's present location and/or the time of observation can be determined. There is also the Global Orbiting Navigational System (GLONASS), which can operate as an alternative GPS system.

The GPS is part of a satellite-based navigation system developed by the United States Defense Department under its NAVSTAR satellite program. A fully operational GPS includes up to 24 Earth satellites approximately uniformly dispersed around six circular orbits with four satellites each, the orbits being inclined at an angle of 55° relative to the equator and being separated from each other by multiples of 60° longitude. The orbits have radii of 26,560 kilometers and are approximately circular. The orbits are non-geosynchronous, with 0.5 sidereal day (11.967 hours) orbital time intervals, so that the satellites move with time relative to the Earth below. Theoretically, three or more GPS satellites will be visible from most points on the Earth's surface, and visual access to three or more such satellites can be used to determine an observer's position anywhere on the Earth's surface, 24 hours per day. Each satellite carries a cesium or rubidium atomic clock to provide timing information for the signals transmitted by the satellites. Internal clock correction is provided for each satellite clock.

Each GPS satellite transmits two spread spectrum, L-band carrier signals: an L1 signal having a frequency f1=1575.42 MHz and an L2 signal having a frequency f2=1227.6 MHz. These two frequencies are integral multiples f1=1540 f0 and f2=1200 f0 of a base frequency f0=1.023 MHz. The L1 signal from each satellite is binary phase shift key (BPSK) modulated by two pseudo-random noise (PRN) codes in phase quadrature, designated as the C/A-code and P(Y)-code. The L2 signal from each satellite is BPSK modulated by only the P(Y)-code. The nature of these PRN codes is described below.

One motivation for use of two carrier signals L1 and L2 is to allow partial compensation for propagation delay of such a signal through the ionosphere, which delay varies approximately as the inverse square of signal frequency f (delay~$f^2$). This phenomenon is discussed by MacDoran in U.S. Pat. No. 4,463,357, which discussion is incorporated by reference herein. When transit time delay through the ionosphere is determined, a phase delay associated with a given carrier signal can also be determined.

Use of the PRN codes allows use of a plurality of GPS satellite signals for determining an observer's position and for providing the navigation information. A signal transmitted by a particular GPS satellite is selected by generating and matching, or correlating, the PRN code for that particular satellite. All PRN codes are known and are generated or stored in GPS satellite signal receivers carried by ground observers. A first PRN code for each GPS satellite, sometimes referred to as a precision code or P(Y)-code, is a relatively long, fine-grained code having an associated clock or chip rate of 10 f0=10.23 MHz. A second PRN code for each GPS satellite, sometimes referred to as a clear/acquisition code or C/A-code, is intended to facilitate rapid satellite signal acquisition and hand-over to the P(Y)-code and is a relatively short, coarser-grained code having a clock or chip rate of f0=1.023 MHz. The C/A-code for any GPS satellite has a length of 1023 chips or time increments before this code repeats. The full P(Y)-code has a length of 259 days, with each satellite transmitting a unique portion of the full P(Y)-code. The portion of P(Y)-code used for a given GPS satellite has a length of precisely one week (7.000 days) before this code portion repeats. Accepted methods for generating the C/A-code and the P(Y)-code are set forth in the document GPS Interface Control Document ICD-GPS-200, published by Rockwell International Corporation, Satellite Systems Division, Revision B-PR, 3 Jul. 1991, which is incorporated by reference herein.

The GPS satellite bit stream includes navigational information on the ephemeries of the transmitting GPS satellite (which includes a complete information about the transmitting satellite within the next several hours of transmission) and an almanac for all GPS satellites (which includes less detailed information about all other satellites). The satellite information has the parameters providing corrections for ionospheric signal propagation delays suitable for single frequency receivers and for an offset time between satellite clock time and true GPS time. The navigational information is transmitted at a rate of 50 Baud. A useful discussion of the GPS and techniques for obtaining position information from the satellite signals is found in *The NAVSTAR Global Positioning System*, Tom Logsdon, Van Nostrand Reinhold, New York, 1992, pp. 17–90.

A second alternative configuration for global positioning is the Global Orbiting Navigation Satellite System (GLONASS), placed in orbit by the former Soviet Union and now maintained by the Russian Republic. GLONASS also uses 24 satellites, distributed approximately uniformly in three orbital planes of eight satellites each. Each orbital plane has a nominal inclination of 64.8° relative to the equator, and the three orbital planes are separated from each other by multiples of 120° longitude. The GLONASS circular orbits have smaller radii, about 25,510 kilometers, and a satellite period of revolution of 8/17 of a sidereal day (11.26 hours). A GLONASS satellite and a GPS satellite will thus complete 17 and 16 revolutions, respectively, around the Earth every 8 days. The GLONASS system uses two carrier signals L1 and L2 with frequencies of f1=(1.602+9k/16) GHz and f2=(1.246+7k/16) GHz, where k(=0,1,2, ... 23) is the channel or satellite number. These frequencies lie in two bands at 1.597–1.617 GHz (L1) and 1,240–1,260 GHz (L2). The L1 code is modeled by a C/A-code (chip rate=0.511 MHz) and by a P(Y)-code (chip rate=5.11 MHz). The L2 code is presently modeled only by the P(Y)-code. The GLONASS satellites also transmit navigational data at a rate of 50 Baud. Because the channel frequencies are distinguishable from each other, the P(Y)-code is the same, and the C/A-code is the same, for each satellite. The methods for receiving and analyzing the GLONASS signals are similar to the methods used for the GPS signals.

Reference to a Satellite Positioning System or SATPS herein refers to a Global Positioning System, to a Global Orbiting Navigation System, and to any other compatible satellite-based system that provides information by which an observer's position and the time of observation can be determined, all of which meet the requirements of the present invention.

A Satellite Positioning System (SATPS), such as the Global Positioning System (GPS) or the Global Orbiting Navigation Satellite System (GLONASS), uses transmission of coded radio signals, with the structure described above, from a plurality of Earth-orbiting satellites. An SATPS antenna receives SATPS signals from a plurality (preferably four or more) of SATPS satellites and passes these signals to an SATPS signal receiver/processor, which (1) identifies the SATPS satellite source for each SATPS signal, (2) determines the time at which each identified SATPS signal arrives at the antenna, and (3) determines the present location of the SATPS satellites.

The range ($R_i$) between the location of the i-th SATPS satellite and the SATPS receiver is equal to the speed of light c times ($\Delta t_i$), wherein ($\Delta t_i$) is the time difference between the SATPS receiver's clock and the time indicated by the satellite when it transmitted the relevant phase. However, the SATPS receiver has an inexpensive quartz clock which is not synchronized with respect to the much more stable and precise atomic clocks carried on board the satellites. Consequently, the SATPS receiver actually estimates not the true range Ri to the satellite but only the pseudo-range (ri) to each SATPS satellite.

The SATPS receiver is capable of determining receiver absolute position in an Earth-centered, Earth-fixed coordinate reference system utilized by the SATPS by obtaining the navigational solution of the set of four simultaneous equations:

$$(x1-x0)^2+(y1-y0)^2+(z1-z0)^2=(r1-cb)^2 \quad \text{(Eq.1)}$$

$$(x2-x0)^2+(y2-y0)^2+(z2-z0)^2=(r2-cb)^2 \quad \text{(Eq.2)}$$

$$(x3-x0)^2+(y3-y0)^2+(z3-z0)^2=(r3-cb)^2 \quad \text{(Eq.3)}$$

$$(x4-x0)^2+(y4-y0)^2+(z4-z0)^2=(r4-cb)^2 \quad \text{(Eq.4)}$$

wherein:
- (ri) is a pseudorange between the i-th satellite and the SATPS receiver;
- (xi,yi,zi) is a 3-dimension coordinate of the i-th SATPS satellite;
- (x0,y0,z0) is a 3-dimension unknown coordinate of the SATPS receiver position;
- (cb) is the SATPS receiver clock bias error.

After the SATPS receiver determines the coordinates of the i-th SATPS satellite by picking up transmitted ephemeries constants, the SATPS receiver can obtain the solution of the set of the four equations for its unknown coordinates (x0,y0,z0) and for unknown time bias error (cb). The SATPS receiver can also obtain its heading and speed. (See *The Navstar Global Positioning System*, Tom Logsdon, Van Nostrand Reinhold, 1992, pp. 8–33, 44–75, 128–187.)

After determining its coordinates, speed and heading using the SATPS or GPS receiver, the vehicle 12 with the watson device 42 can communicate this information to the base station 28 using the communication link 27 as shown in FIG. 1.

The communication link connects each watson device with the base station. In general, the communication link can employ a radiowave frequency band, an infrared frequency band, or a microwave frequency band.

In one embodiment, the communication link can include the ISM (industrial scientific medical) unlicensed operation band, including 900 MHz, 2.4 GHz, or 5.8 GHz bands, wherein the user can own the both ends of the ISM communication system. The ISM technologies are manufactured by Metricom, Los Gatos, Calif., and by Utilicom, Santa Barbara, Calif.

In another embodiment, the communication link can employ a 1.8 GHz band that supports the personal communications services (PCS). The PCS uses the international standard DCS-1800. Yet, in one more embodiment, the communication link can include a real time circuit switched communication link. For instance, the communication link employing a real time circuit switched communication link can include the Iridium satellite system produced by Motorola, Schaumburg, Ill. In one additional embodiment, the communication link can employ a Low Earth Orbiting Satellite (LEOS) which can be used to store and to forward digital packet data. The LEOS systems in 27 GHz range are manufactured by Teledesic located in Redmond, Wash., and the LEOS systems in 5 GHz range are produced by Oriscom located in Chantilly, Va.

The communication means can include a cellular telephone communication means, a paging signal receiving means, a wireless messaging services, a wireless application services, a wireless WAN/LAN station, or an Earth-satellite-Earth communication module that uses at least one satellite to relay a radiowave signal.

In the preferred embodiment, the communication means includes the cellular telephone communication means that can include an Advanced Mobile Phone System (AMPS) with a modem. The modem can comprise a DSP (digital signal processor) modem in 800 MHz range, or a cellular digital packet data (CDPD) modem in 800 MHz range. The cellular digital communication means includes a means of modulation of digital data over a radiolink using a time division multiple access (TDMA) system employing format IS-54 or a code division multiple access (CDMA) system employing format IS-95. The TDMA system used in Europe is called groupe special mobile (GSM) in French. The GSM system can be also used in one of the watson embodiments.

In the preferred embodiment, the base station 28 includes a touch-tone telephone 34, a computer 32 and a Hayes-AT compatible base station modem 30. The computer 32 can be implemented by using a personal computer IBM-386 or IBM-486 running Microsoft Windows® operating system. The modem can be implemented by utilizing a Dataport® modem produced by AT&T Paradyne, Largo, Fla.

Figure 2:
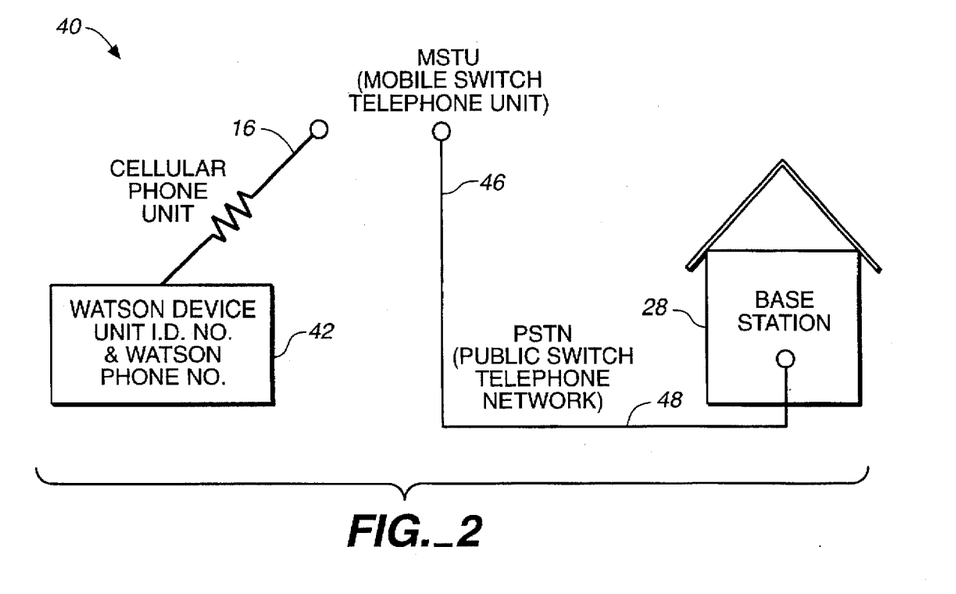
FIG. 2 depicts a personal tracking system using a cellular phone for wireless link between a watson device and a base station.
Figure 3:
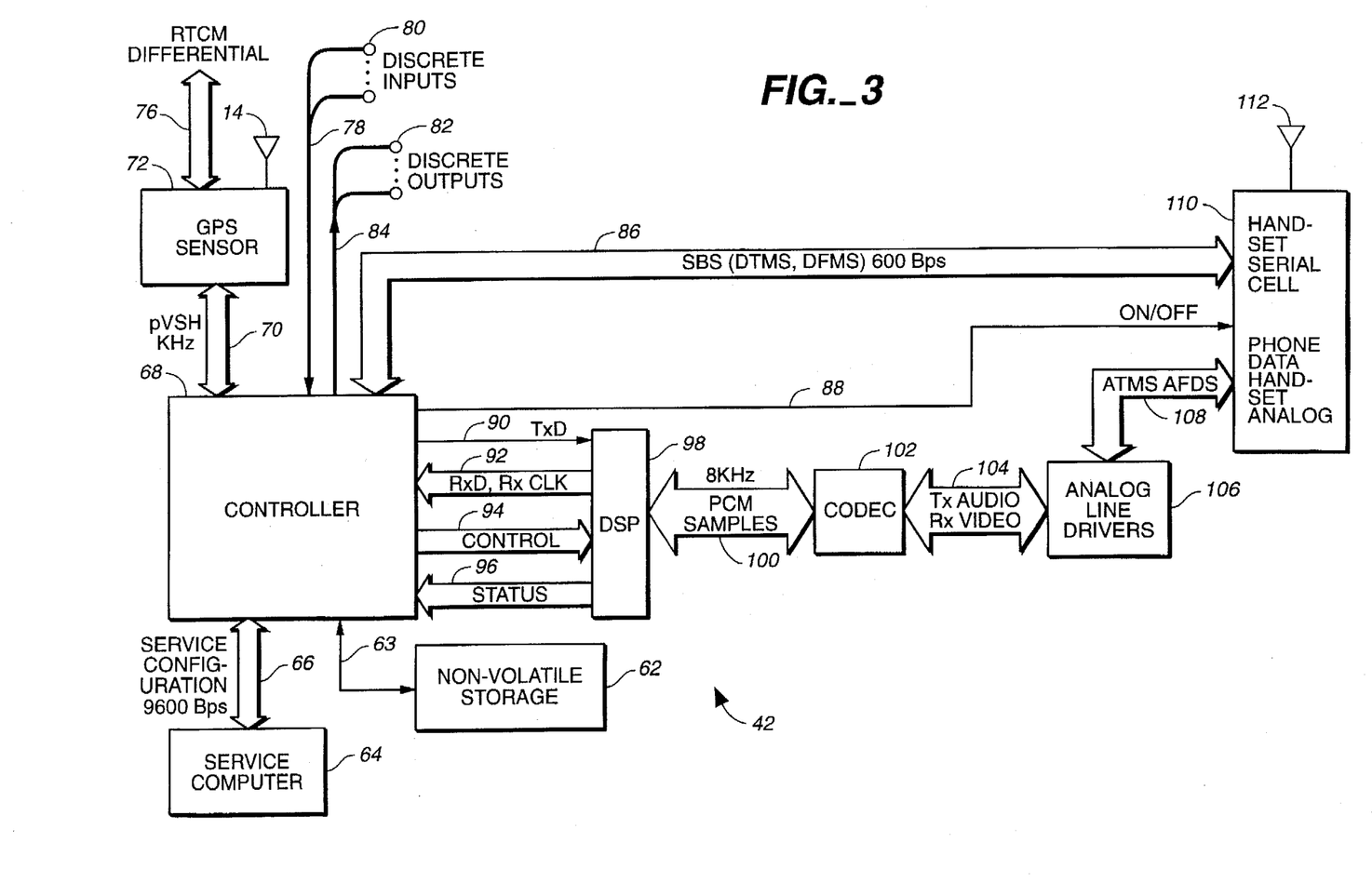
FIG. 3 shows an architecture of a watson device.

In the preferred embodiment, the communication link 27 (FIG. 1) is implemented by using a cellular phone with a modem 98 DSP (digital signal processor) as shown in FIGS. 2 and 3. The conventional public telephone service known as the public switched telephone network (PSTN) provides national and international coverage by means of a fixed network switching and numbering hierarchy. The cellular phone system decouples the telephone from its wires to the local exchange (LE) to provide a radiotelephone using radio communication channels. To connect to the PSTN, the mobile unit employs a mobile switch telephone unit (MSTU). The cellular phone system has two main parameters: the radio range or coverage, and the number of channels or voice circuits.

The mobile station (MS) (or handset) which denotes the radiotelephone is connected to the base station (BS) by means of a two-way radio link. The mobile unit must have the property of frequency agility which means that it can operate at different radio frequencies or channels. The frequency agility allows the subscriber to move out from the range of one base station (or radio cell) to another radio cell because the subscriber equipment can switch to a new channel operating from a new site. Thus, the user can enjoy continuous coverage wherever the user roams from one area to another. At the same time, the channel which is no longer in use by the first subscriber can be reassigned to the second subscriber within the same cell. To manage this strategy, it is necessary to have a fully integrated transparent fixed network of cellular radio. Base stations as well as cell clusters must be linked together. Registration centers must keep track of the "who, where, and which" of subscribers. The fixed network must do the call routing within, into, or out of the network. Thus, a cellular radio network has a complex switching and numbering hierarchy. These cellular radio principles are applicable to all systems, whether analog, digital, or hybrid.

Two radio channels, forward and reverse, must be allocated to each mobile unit for duplex operation; that is, the user expects to speak and listen at the same time. The forward channel refers to the base-to-mobile path, and the reverse channel refers to the mobile-to-base path. Both the base station and the mobile station require radio transmitter circuits. The mobile station carries its own telephone number in internal memories. The mobile station also contains a radio receiver, as well as a transmitter and tuning (synthesizer) circuits, and a battery.

The base station and the mobile station automatically keep in touch with various handshaking signals. A call is set up by depressing a specific SEND button. When an outside call is received for a mobile station, the call has to be routed to the cell in which the mobile is located so the call can be connected. When a mobile station is engaged in a call, it will frequently move out of the coverage area of the base station it is communicating with, and unless the call is passed on to another cell, it will be lost. In an analog cellular system, there is network-controlled handover; that is, the system continuously monitors the signals received from mobiles engaged in calls, checking on signal strength and quality. When the signal falls below a preset threshold, the system will check whether any other base station can receive the mobile unit at better strength. If this is the case, the system will allocate a channel for the call on that new base station, and the mobile unit will be commanded by a signaling message to switch to the new frequency. The whole process of measurement, channel allocation, and handover may take a few seconds to complete, but the user will notice a brief break in conversation as the handover itself is carried out. *Cellular Radio Systems*, by D. M. Balston, and R. C. V. Macario, Artech House, Inc., 1993, pp 3–17.

As shown in FIG. 2, the cellular phone unit 16 employs a mobile switch telephone unit (MSTU) 46 to transmit the call to the fixed supporting network, which can be a public switch telephone network (PSTN) 48, which carries the call to the base station 28 and to the base station telephone 34.

The watson device 42 (FIG.3) installed in the mobile unit 12 (FIG. 1) includes a GPS sensor-receiver 72 having the antenna 14 which determines the coordinates, speed, and heading of the mobile unit; a system controller 68 which is connected to the GPS receiver and controls the propagation of all signals within the mobile unit, and a communication system including a cell phone-data device 110 for providing an interface with the base station 28 (FIG. 2).

The controller 68 can be implemented by using a microprocessor Dallas® 80C320, manufactured by the Dallas Semiconductors Inc., Dallas, Tex. The infrastructure to support the cellular calls and data communication can be provided by GTE-MobilNet, Atlanta, Ga. The cell phone may be implemented by using a GE-Ericsson 'Carfone V' AMPS cellular mobile radio, having no handset, and handling only data transmission. If this is the case, the mobile station should have a data transmitting and receiving capability.

A digital signal processor (DSP) (or modem) 98 is connected to a codec 102 through a bus 100 for passing pulse-code modulation sampled signals. The codec 102 includes an analog-to-digital converter and a digital-to-analog converter. The analog-to-digital converter converts external analog signals received by the cell phone-data device from the base station into internal digital signals which are processed by the controller. At the same time, the digital-to-analog converter converts internal digital signals generated by the controller into the external analog signals transmitted to the base station by the cell phone-data device 110. The codec 102 is connected to an analog line driver (ALD) device 106 through bus 104 for passing digital signals generated by the controller (and converted to analog signals by the codec) to the base station, and for passing analog signals received from the base station by the cell phone-data device to the controller. The ALD device also adjusts the level of signals passed to and from the controller.

The GPS receiver 72 processes the satellite data and communicates the position, time, speed, and heading of the mobile unit to a controller 68 through a bus 70. A cable 76 is used for interface with an external GPS system for obtaining differential position data. The system controller 68 controls the transmission of the position data according to a programmed set of control instructions supplied to the controller 68 by a non-volatile memory 62 accessible through a bus 63. Initial configuration including determination of the sending times (sending times are times at which watson transmits its position data to the base station) is programmed by a service computer 64 through a bus 66. As a result, the programmed controller 68 transmits the position data to the cellular phone 110 through busses 86, 88, 90, 92, 94, and 96 at sending times. Accordingly, the cellular phone 110 transmits the position data to the base station 28 (FIG.2) at the same sending times. The initial sending time as well as the frequency of transmission can be programmed also externally by the base station 28 as described below. The alternative determination of sending times may include the transmission of position data by the watson device to the base station at certain times when the roving mobile unit with the installed watson device reaches the boundaries of a certain geographical area designated as an alarm zone. In another embodiment, the determination of sending times may include the transmission of position data by the watson device to the base station at certain distances and at certain times when the roving mobile unit with the installed watson device reaches the certain distances at certain times.

The watson device 42 ( see FIG. 1) can be installed in any mobile vehicle 12 like a personal automobile, a rental automobile, a truck, a delivery van, or a trailer. The watson device can be installed on the body of a child, on the body of an arrestee, on the body of an old patient with limited or impaired memory capability. The watson device can be hidden inside a personal belonging. The watson device receives the position information from the satellites and transmits this data employing a protocol recognized by the modem 30 connected to the personal computer 32 at the base station 28 (see FIG. 1). The protocol can be a conventional Hayes command set recognizable by the Hayes-AT compatible modem 30.

Figure 4:
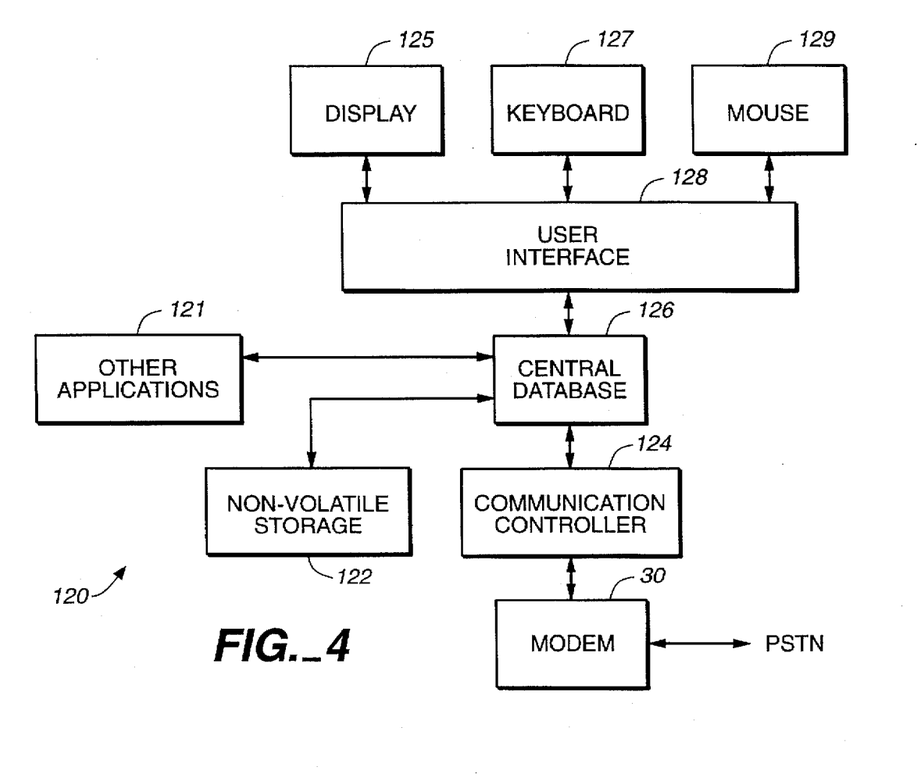
FIG. 4 illustrates a base station with the base station software (BSS).

In the preferred embodiment, the computer 32 includes a base station software (BSS) system San Diego® produced by Trimble Navigation Inc., Sunnyvale, Calif. The BSS includes a custom-made user interface 128 and a custom-made communication controller 124 connected to the Hayes-AT compatible modem 30 as illustrated in FIG. 4.

A central database 126 can be implemented by using a Paradox® database engine manufactured by Borland, Scotts Creek, Calif. The remainder of the database is implemented by using the TRIMBLE custom-made software which allows the database to communicate with the communication controller 124 or other software applications 121 as shown in FIG. 4.

The BSS contains maps and communication programs. Maps can be stored in the non-volatile storage 122. The BSS has three main functions. At first, it should be able to communicate with the watson device installed in the mobile unit using the modem. As a result of this communication, the BSS should be able to receive the location data from the watson device. Secondly, the BSS should be able to display the location of the mobile unit on the electronic map and to follow the movement of the mobile unit on the map at certain sending times at which the BSS receives the updated position data from the mobile unit employing the watson device. Lastly, the BSS should have a capability to change the configuration of the controller 68 inside the watson device (FIG. 3). This means that the BSS should be able to request the vehicle ID from the mobile unit, to obtain the telephone number of the cellular phone 110 (FIG.3), and to change the sending times and the frequency of the data transmission by the watson device 42 (FIG.3).

Figure 5A:
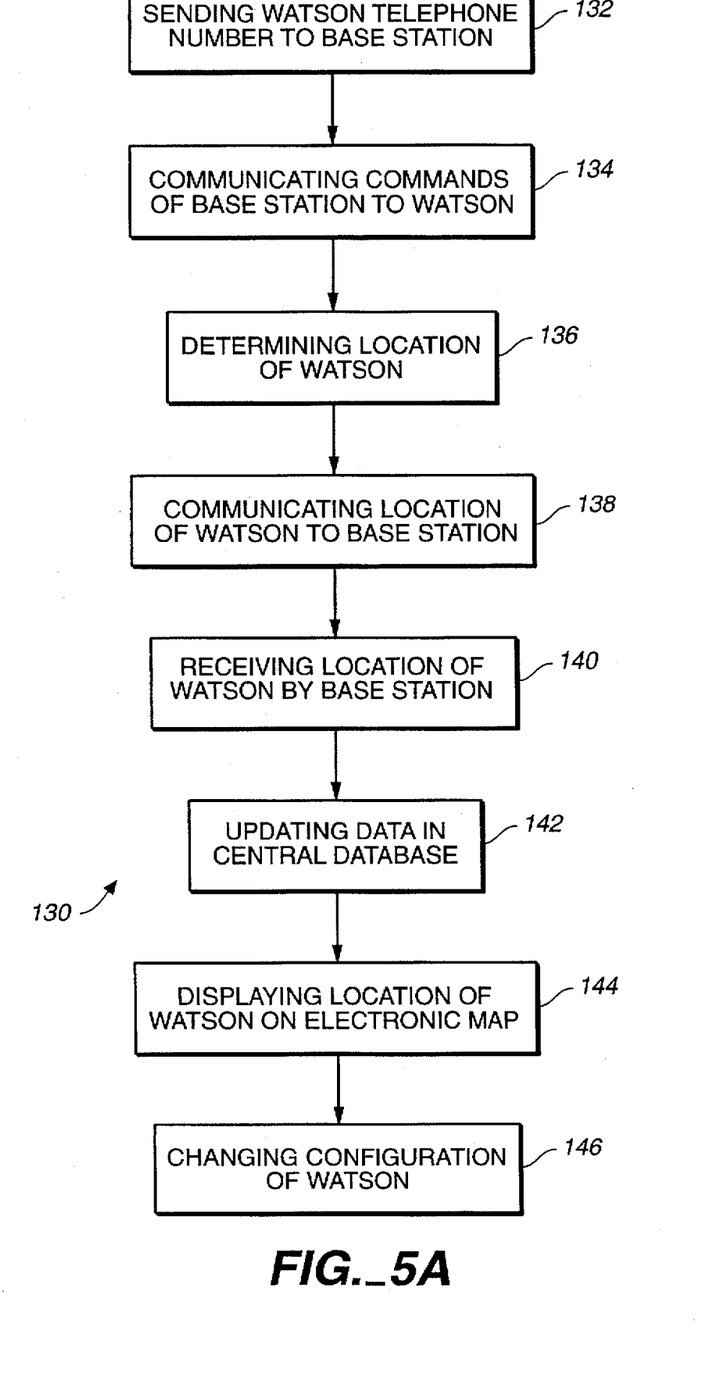
FIG. 5A depicts a flowchart describing the steps of the tracking process using a watson device and a base station.

FIG. 5A illustrates the flowchart describing the steps of the tracking process using the watson device installed in the mobile unit and the base station with the BSS to track the location of the mobile unit. The step 132 corresponds to the step of sending the watson telephone number to the base station by the watson device 42 using the cell phone-data unit 110 with the antenna 112 (FIG. 3) to make a positive identification of the mobile unit. The invention is not limited to tracking of the single mobile unit. The base station can track a plurality of mobile units, each of them having an installed watson device with its own watson telephone number, the same way it can track a single mobile unit. It can be done by sequentially communicating with each single watson device, one after another. Therefore, the following discussion is valid for a plurality of mobile units, each of them having an installed watson device.

The step 134 describes the communicating commands of the base station to the watson device using the communication software of the BSS. The commands transmitted from the base station to the watson device may include commands like: (1) a command to send the position data; (2) a command to set certain sending times for transmission of the position data; (3) a command to set certain frequency of transmission of the position data; (4) a command to set a sending time when the mobile unit reaches a certain position or a boundary of a certain area (alarm zone); (5) a command to set certain route and certain schedule; (6) a command to set the coordinates of certain distances. This step is performed by the BSS and is described in detail below. (See FIG. 5B).

The step 136 is the step of determining the position data of each of the plurality of mobile units. This step is performed by the GPS receiver 72, including the GPS antenna 14 of each watson unit. The next step is the step 138 of communicating the location data of each mobile unit to the base station by employing the cell phone-data unit 110 including the antenna 112. After receiving the position data from each mobile unit (step 140), the BSS updates the position data of each mobile unit in the non-volatile memory storage 122 (FIG.4) (step 142) and displays the location of each mobile unit in the electronic map of the display 125 (step 144). Finally, the BSS can change the configuration of each of the watson devices (step 146), that is, the BSS can change the sending times of the position data transmission, the frequency of the data transmission for each watson device.

The electronic map can be displayed on a control display module 125 using a keyboard 127 and a mouse 129. This display is a convenient man-machine interface between the user and the computer 32 (FIG. 1). The control display is designed to accept inputs and instructions from the user through the user interface 128 (FIG.4) including the desired operating modes, coordinate systems, and any necessary encryption keys. The current position and velocity of each watson device can be automatically displayed on liquid crystal display (LCD), or cathode ray tube (video) screens. The control display unit can also display the exact time of the particular location of each watson device.

Figure 5B:
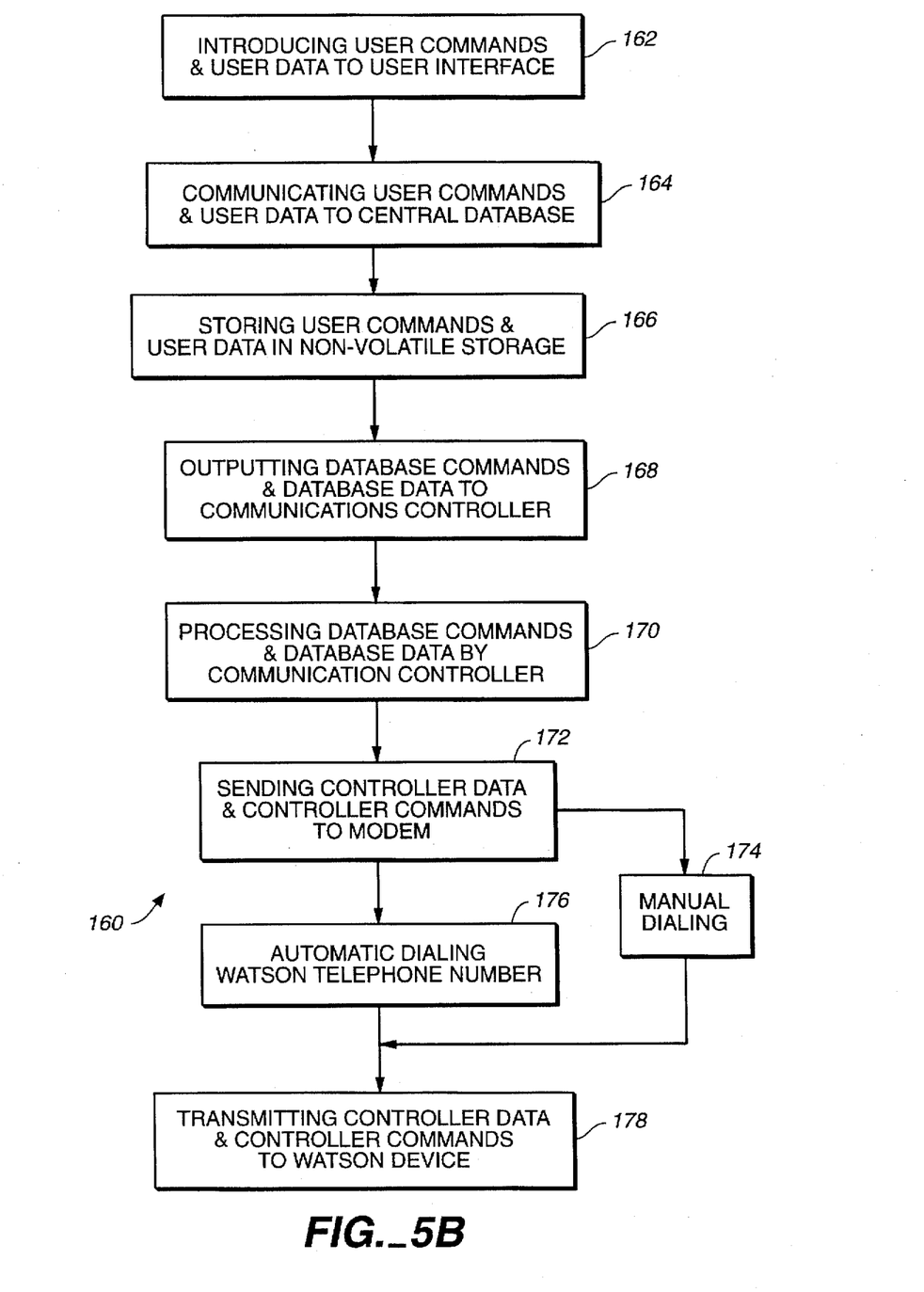
FIG. 5B is an illustration of the detailed flowchart describing the steps of the tracking process performed by the BSS.

FIG. 5B illustrates the detailed flowchart describing the flow of programs and data in the BSS. The user can utilize the user interface 128 to introduce the user commands and the user data (step 162). The user commands and data may include the commands for the particular mobile unit to send its telephone number, or to send its vehicle ID number, or to start sending its position data at certain sending times and at certain sending frequencies, or to send the position data at certain times when the particular watson device reaches the boundaries of a certain geographical area. The user-commands and the user-data are further communicated to the central database 126 (step 164), stored in the non-volatile storage 122 (step 166), and transmitted to the communication controller 124 (step 168) as the database commands and data. The database commands and data may be different from the user-commands and user-data because they may contain the data and commands stored in the non-volatile storage.

The communication controller processes the database commands and data (step 170) and sends the controller-data and the controller-commands to the modem 30 (step 172). The modem can automatically dial the watson telephone number (step 176), or the user can dial the watson telephone number manually (step 174). After dialing the watson number, the BSS can transmit the controller-data and controller commands to the watson device (step 178).

Figure 5C:
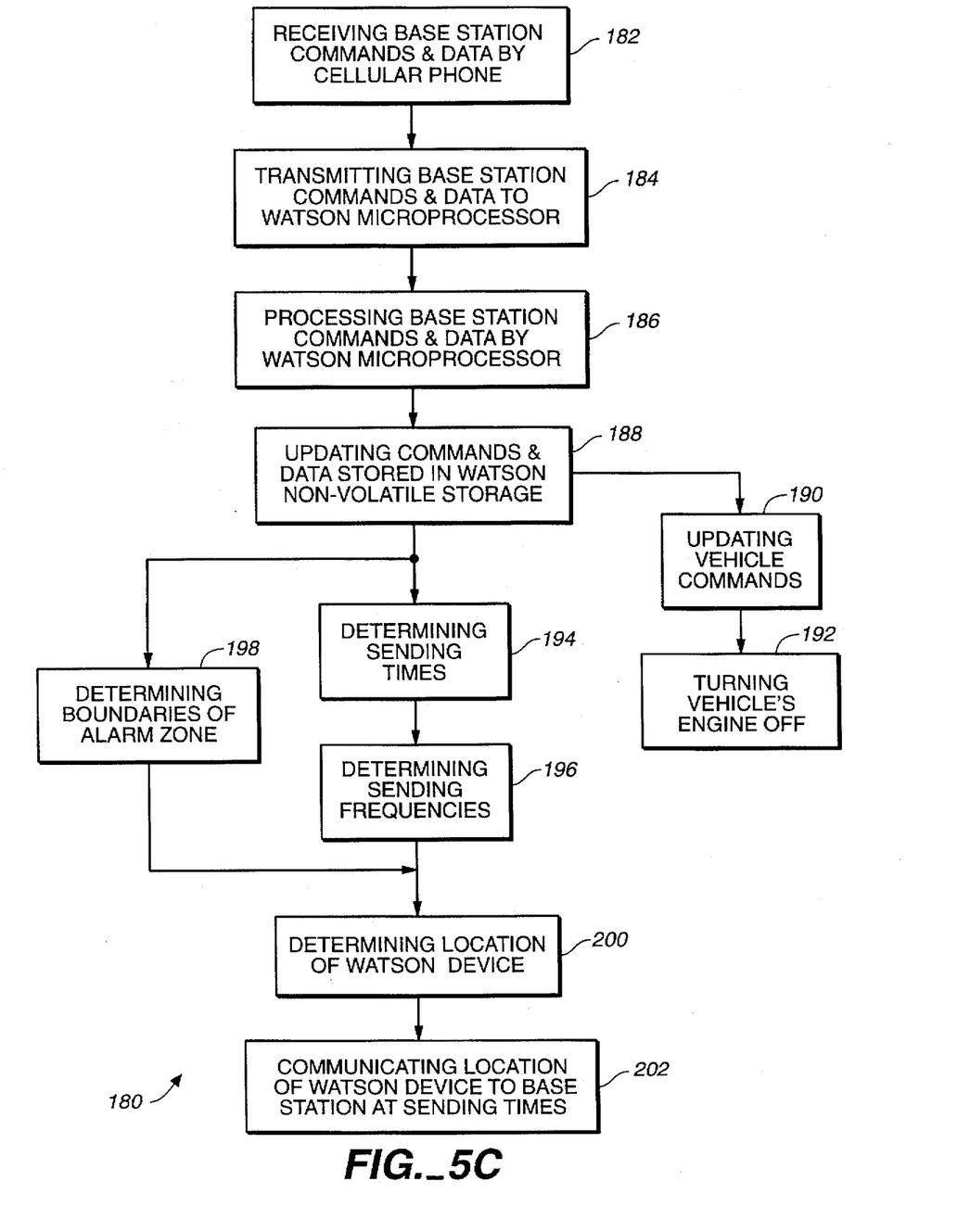
FIG. 5C shows steps of the tracking process performed by the watson device.

FIG. 5C illustrates the steps of the tracking process performed by the watson device. After receiving the base station commands and data (step 182), the cellular phone-data receiver 110 (FIG. 3) transmits the commands and data to the controller 68 (step 184). The watson controller processes the base station commands and data (step 186) and updates the commands and data stored in its non-volatile storage 62 (FIG. 3) (step 188). The updating of watson controller commands includes the updating of the vehicle commands (step 190), including turning off the vehicle's engine (step 192). The watson controller can also determine the sending times (step 194), the sending frequencies (step 196), and the boundaries of the alarm zone (step 198). At sending times, the GPS receiver 72 (FIG.3) determines the position data of the mobile unit (step 200) and communicates the location data to the base station (step 202).

The description of the preferred embodiment of this invention is given for purposes of explaining the principles thereof, and is not to be considered as limiting or restricting the invention since many modifications may be made by the exercise of skill in the art without departing from the scope of the invention.

What is claimed is:

1. A method of personal tracking, said method using a personal tracking system; said system comprising at least one watson communication device and a base station; each said watson communication device having a watson ID-number; each said watson device including a position determining device, a receiver, a communication device, and a microprocessor; said base station including a computer, a modem, and a base station software (BSS); said BSS including a user interface, a central database, a non-volatile memory, a plurality of other applications, and a communications controller; said method comprising the steps of:

sending each said watson ID-number to said base station by each said watson device;

communicating the commands of said base station to each said watson communications device;

determining the location of each said watson device;

communicating the location of each said watson device to said base station;

receiving the location of each said watson device by said base station;

updating the data related to each said watson device in said non-volatile storage of said base station;

displaying the location of each said watson device on a electronic map; said electronic map being a part of said base station software;

changing the configuration of each said watson device by receiving commands and data from said base station by said communication means of each said watson device, by transmitting said base-station-commands and base-station-data to said microprocessor means of each said watson device, and by processing said base-station commands and base-station-data by said watson microprocessor;

updating commands and data stored in said non-volatile memory by updating vehicle commands, wherein each said watson device is installed in the vehicle; and wherein the step of updating commands and data stored in said non-volatile memory of at least one said watson device further includes the step of receiving the route and the schedule information by at least one said watson device from said base station, and wherein at least one said watson device reports its adherence to or deviation from said received route and said received schedule to said base station.

2. The method of claim 1, wherein the step of communicating the location of at least one said watson device to said base station further comprises the step of reporting its coordinates to said base station when said watson device adheres to or deviates from said route or said schedule.

3. The method of claim 2, wherein the step of displaying the location of each said watson device on said electronic map of said base station further comprises the steps of:

receiving the coordinates of location of said watson device when said watson device adheres to or deviates from said route and said schedule; and imposing the route and the schedule of said watson device on said electronic map.

* * * * *